United States Patent
Endoh et al.

(10) Patent No.: US 12,113,888 B2
(45) Date of Patent: Oct. 8, 2024

(54) FRAME SYNCHRONIZATION SYSTEM, FRAME SYNCHRONIZATION CIRCUIT, AND FRAME SYNCHRONIZATION METHOD

(71) Applicant: NTT ELECTRONICS CORPORATION, Yokohama (JP)

(72) Inventors: Yasuyuki Endoh, Yokohama (JP); Masaaki Iizuka, Yokohama (JP)

(73) Assignee: NTT ELECTRONICS CORPORATION, Yokohama (JP)

( * ) Notice: Subject to any disclaimer, the term of this patent is extended or adjusted under 35 U.S.C. 154(b) by 130 days.

(21) Appl. No.: 17/996,275

(22) PCT Filed: Apr. 12, 2021

(86) PCT No.: PCT/JP2021/015135
§ 371 (c)(1),
(2) Date: Oct. 14, 2022

(87) PCT Pub. No.: WO2021/215286
PCT Pub. Date: Oct. 28, 2021

(65) Prior Publication Data
US 2023/0198737 A1   Jun. 22, 2023

(30) Foreign Application Priority Data
Apr. 20, 2020  (JP) ................................ 2020-074614

(51) Int. Cl.
*H04L 7/06*   (2006.01)
*H04L 7/00*   (2006.01)

(52) U.S. Cl.
CPC .............. *H04L 7/06* (2013.01); *H04L 7/0075* (2013.01)

(58) Field of Classification Search
CPC .................. H04L 7/06; H04L 7/0075
(Continued)

(56) References Cited

U.S. PATENT DOCUMENTS 6,552,702 B1 *  4/2003  Abe ...................... H01J 31/127
                                                        345/98
10,439,732 B2 * 10/2019  Oyama .............. H04B 10/6165
(Continued)

FOREIGN PATENT DOCUMENTS

JP       01-261939 A       10/1989
JP       H11177546 A *      7/1990
(Continued)

OTHER PUBLICATIONS

Lee et al; Robust Frame Synchronization for Low Signal-to-Noise Ratio Channels Using Energy-Corrected Differential Correlation; Feb. 2009; Hindawi Publishing Corporation; pp. 1-8. (Year: 2009).*
(Continued)

*Primary Examiner* — Amritbir K Sandhu
(74) *Attorney, Agent, or Firm* — WOMBLE BOND DICKINSON (US) LLP

(57) ABSTRACT

A frame synchronization system (1) according to this invention includes a frame signal generation circuit (20) configured to generate a frame signal including a plurality of first frame signals each including a first frame synchronization signal and a first payload signal, wherein the first frame synchronization signal is formed from at least one symbol and is set with an average amplitude lower than an average amplitude of the first payload signal, and a frame synchronization circuit (60) configured to receive the frame signal via an optical transmission path (70), and detect the first frame synchronization signal from a received signal, wherein the received signal is divided into frames having a symbol length of the first frame signal, coordinate values, on an IQ plane, of the signals at identical symbol positions of the plurality of divided frames are added over the plurality of frames, and a symbol specified by magnitude comparison in the frame based on an addition result is determined as the first frame synchronization signal. Even if a transmission (Continued)

rate is high, it is possible to decrease the probability of erroneous synchronization, thereby shortening the time until frame synchronization is established.

8 Claims, 6 Drawing Sheets

(58) Field of Classification Search
USPC .......................................................... 398/154
See application file for complete search history.

(56) References Cited

U.S. PATENT DOCUMENTS

| | | | | |
|---|---|---|---|---|
| 2010/0183060 | A1* | 7/2010 | Lee | H04L 7/042 |
| | | | | 375/222 |
| 2013/0022351 | A1 | 1/2013 | Arikawa | |
| 2015/0295747 | A1* | 10/2015 | Tanaka | H04B 10/516 |
| | | | | 375/261 |
| 2016/0099776 | A1 | 4/2016 | Nakashima et al. | |
| 2021/0167939 | A1* | 6/2021 | Yoshida | H04L 7/00 |
| 2023/0198737 | A1* | 6/2023 | Endoh | H04L 7/06 |
| | | | | 398/154 |

FOREIGN PATENT DOCUMENTS

| | | | |
|---|---|---|---|
| JP | H11177546 | * | 12/1997 |
| JP | 11-177546 A | | 7/1999 |
| JP | 2009218744 A | * | 9/2009 |
| JP | 2016-019030 A | | 2/2016 |
| JP | 2016-072942 A | | 5/2016 |
| JP | 2019-213218 A | | 12/2019 |
| WO | 2011/125964 A1 | | 10/2011 |

OTHER PUBLICATIONS

International Preliminary Report on Patentability received for PCT Patent Application No. PCT/JP2021/015135, mailed on Nov. 3, 2022, 11 pages (6 pages of English Translation and 5 pages of Original Document).

International Search Report and Written Opinion received for PCT Patent Application No. PCT/JP2021/015135, mailed on Jul. 6, 2021, 13 pages (6 pages of English Translation and 7 pages of Original Document).

Office Action received for Japanese Patent Application No. 2020-074614, mailed on Jul. 13, 2021, 8 pages (5 pages of English Translation and 3 pages of Office Action).

* cited by examiner

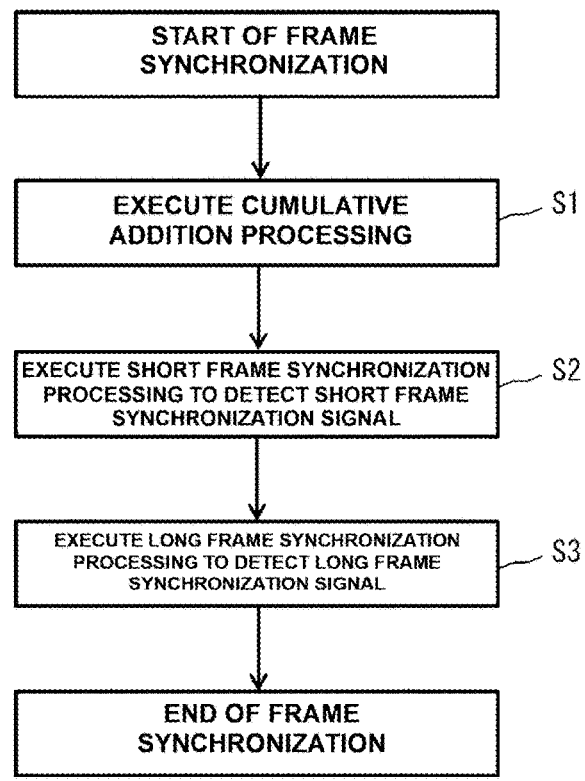
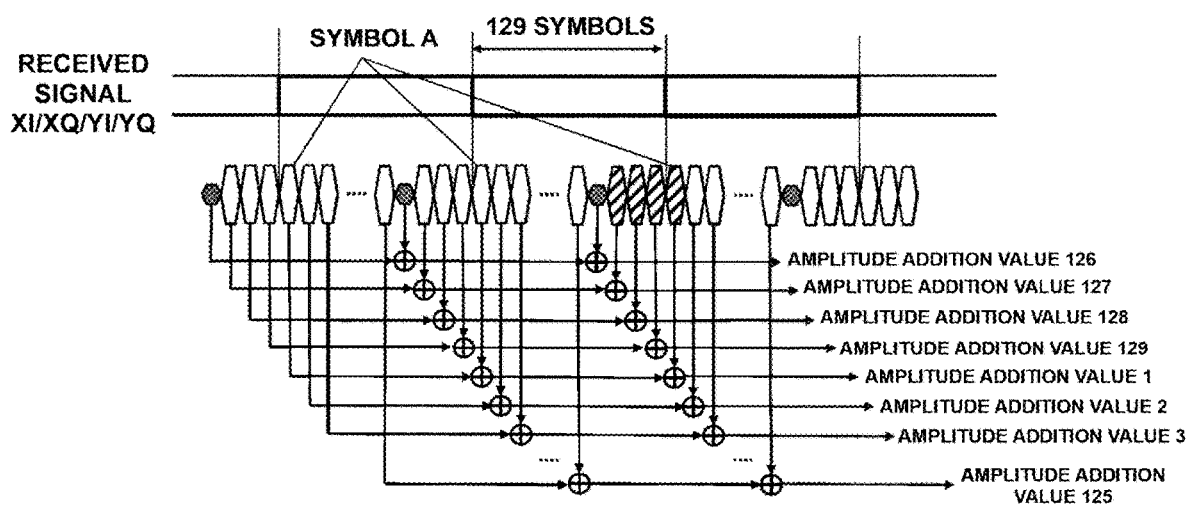

FRAME SYNCHRONIZATION SYSTEM, FRAME SYNCHRONIZATION CIRCUIT, AND FRAME SYNCHRONIZATION METHOD

TECHNICAL FIELD

The present invention relates to a frame synchronization system, a frame synchronization circuit, and a frame synchronization method in data communication.

BACKGROUND ART

In coherent optical communication, a reception side attempts to increase a capacity by compensating for the transmission characteristic by accurate timing synchronization, and transmission at 100 Gbps or higher is currently possible. In timing synchronization, a frame synchronization pattern inserted in advance for each frame of a received signal is used, and whether the synchronization pattern can be detected accurately and quickly influences performance for increasing the capacity.

Since, in optical communication, a symbol error rate becomes high due to wavelength dispersion, polarization dispersion, a deterioration in signal-to-noise ratio, and the like to degrade the transmission characteristic, it is important to accurately detect the synchronization pattern even in this state. In particular, in a system in which the capacity is further increased (for example, 1 Tbps or higher), it is important to detect the synchronization pattern reliably and establish frame synchronization more quickly and accurately even in the state in which the error rate is high.

In optical communication, in general, if a signal is received, frame synchronization is performed by correlating the received signal and a fixed pattern prepared on the reception side on the time axis. When the signal patterns coincide with each other, a correlation value is maximum. Note that if two polarizations are used like in optical communication, correlation is performed independently for each polarization.

In this synchronization method, in the state in which the error rate is increased, the probability of erroneously detecting synchronization is high. If it is determined that detected synchronization is an error, processing of establishing synchronization is executed again. Therefore, as the error rate is higher, the number of times the processing of establishing synchronization is executed again is larger. In this state, it takes time to finally establish correct synchronization. Therefore, even in the state in which the error rate is high, a synchronization method capable of establishing synchronization quickly and reliably is desired.

Patent literature 1 discloses a method of generating a frame pattern by not transmitting at least 1-bit optical signal in a time domain, generating a histogram by integrating data at the identical bit positions in frames divided on the reception side, and detecting the position of the frame pattern from the histogram. This method is associated with an optical communication system before coherent optical communication is performed, and is used for optical pulse transmission of performing communication by turning on/off an optical signal. The integration operation is performed after ON/OFF of the optical signal is determined as 0/1 data. In this method, in a state in which an error rate is low, the reliability of the determination result of the data is high, and it is thus possible to relatively reliably establish synchronization. However, in a state in which the error rate is increased, the probability of erroneously detecting synchronization is high.

Patent literature 2 discloses an optical communication system that performs frame synchronization using a synchronization signal pattern set with average light intensity lower than that of a payload region. In this frame synchronization method, the synchronization signal pattern is detected from a reception bit string, thereby aligning the frame. In this case, since the average light intensity of the synchronization signal pattern is set lower than that of the payload region, nonlinear distortion of the synchronization signal pattern can be made small, thereby correctly aligning the frame. However, the synchronization signal pattern needs to be detectable in a state in which the S/N ratio does not deteriorate significantly.

A frame synchronization apparatus according to patent literature 3 detects a synchronization pattern by detecting a pattern in which the average value of distances on the IQ plane between the symbols of the synchronization pattern and a received signal is minimum. In coherent optical communication, even if a reception symbol error rate is high, a synchronization state can be determined correctly.

RELATED ART LITERATURE

Patent Literature

Patent Literature 1: Japanese Patent Laid-Open No. 2009-218744
Patent Literature 2: Japanese Patent Laid-Open No. 2016-019030
Patent Literature 3: Japanese Patent Laid-Open No. 2019-213218

DISCLOSURE OF INVENTION

Problem to be Solved by the Invention

However, the above-described conventional frame synchronization methods have the following problems. According to patent literature 1, in the state in which the error rate deteriorates, the probability of erroneous synchronization is high, and the frame synchronization method cannot be used as a synchronization method at an increased transmission rate of 1 Tbps or higher. In the frame synchronization method described in patent literature 2, it is difficult to detect a synchronization signal pattern in the state in which the S/N ratio largely deteriorates, and thus this method cannot be used as a synchronization method at an increased transmission rate of 1 Tbps or higher. Furthermore, in the frame synchronization method described in patent literature 3, erroneous synchronization increases in the state in which the error rate is higher, and this method is difficult to use at an increased transmission rate of 1 Tbps or higher. 1 Tbps described above is an example of an index representing the degree of a high transmission rate. For example, a condition of 500 Gbps or higher is also included in a high transmission rate.

As described above, in the conventional frame synchronization methods, if the transmission rate is high, the probability of erroneous synchronization that synchronization is erroneously detected increases in the state in which the error rate is high. If the probability of erroneous synchronization is high, synchronization processing is repeated until synchronization is correctly detected, and thus it takes much time to establish synchronization.

The present invention has been made to solve the above problems, and provides a frame synchronization system that shortens the time until frame synchronization is established by decreasing the probability of erroneous synchronization even if the transmission rate is high.

Means of Solution to the Problem

To solve the above-described problems, a frame synchronization system according to the present invention comprises a frame signal generation circuit configured to generate a frame signal including a plurality of first frame signals each including a first frame synchronization signal and a first payload signal, wherein the first frame synchronization signal is formed from at least one symbol and is set with an average amplitude lower than an average amplitude of the first payload signal, and a frame synchronization circuit configured to receive, via an optical transmission path, the frame signal generated by the frame signal generation circuit, and detect the first frame synchronization signal from a received signal, wherein the received signal is divided into frames having a symbol length of the first frame signal, absolute values of coordinate values, on an IQ plane, of the signals at identical symbol positions of the plurality of divided frames are added over the plurality of frames, and a symbol specified by magnitude comparison in the frame based on an addition result is determined as the first frame synchronization signal.

To solve the above-described problems, a frame synchronization method according to the present invention is a frame synchronization method in a frame synchronization system including a frame signal generation circuit and a frame synchronization circuit, comprising a frame signal generation step of generating a frame signal including a plurality of first frame signals each including a first frame synchronization signal and a first payload signal, wherein the first frame synchronization signal is formed from at least one symbol and is set with an average amplitude lower than an average amplitude of the first payload signal, and a frame synchronization step of receiving, via an optical transmission path, the frame signal generated by the frame signal generation circuit, and detecting the first frame synchronization signal from a received signal, wherein the received signal is divided into frames having a symbol length of the first frame signal, absolute values of coordinate values, on an IQ plane, of the signals at identical symbol positions of the plurality of divided frames are added over the plurality of frames, and a symbol specified by magnitude comparison in the frame based on an addition result is determined as the first frame synchronization signal.

Effect of the Invention

According to the present invention, it is possible to provide a frame synchronization system that shortens the time until frame synchronization is established by decreasing the probability of erroneous synchronization even if a transmission rate is high.

BRIEF DESCRIPTION OF DRAWINGS

FIG. 5 is a flowchart illustrating a frame synchronization method according to the embodiment of the present invention;

FIG. 6 is a view for explaining a method of detecting a short frame synchronization signal according to the embodiment of the present invention;

BEST MODE FOR CARRYING OUT THE INVENTION

Figure 1:
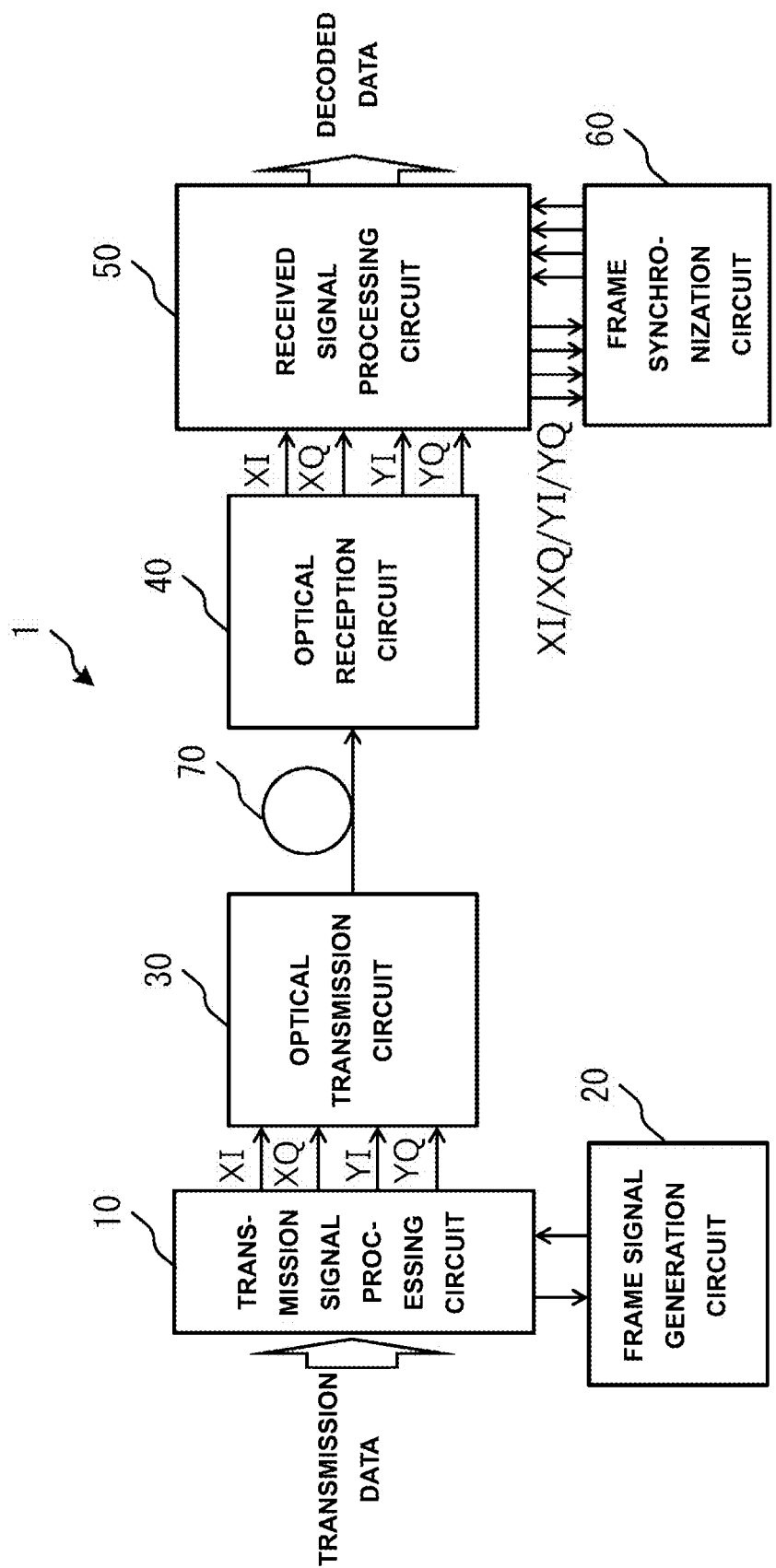
FIG. 1 is a view showing an example of the configuration of a frame synchronization system according to an embodiment of the present invention.

Embodiments of the present invention will be described below with reference to the accompanying drawings. The present invention can be carried out in many different modes, but is not limited to the embodiments of the present invention to be described below.

<Outline of Present Invention>

According to the present invention, frame synchronization is performed in two stages of short frame synchronization and long frame synchronization. A short frame signal is formed by a short frame signal (first frame signal) including a short frame synchronization signal (first frame synchronization signal) and a payload signal (first payload signal). On the other hand, a long frame signal (second frame signal) is formed by a plurality of short frame signals (first frame signals), and a long frame synchronization signal (second frame synchronization signal) representing the position of a long frame is set in a predetermined symbol of the short frame. The setting location of the long frame synchronization signal may be arbitrary as long as the position of the long frame can be specified. The long frame synchronization signal is generally set in the first short frame signal, but may be set around the center or in the last short frame. Alternatively, the long frame synchronization signal can be set over a plurality of short frame synchronization signals, as will be described later.

According to the present invention, the short frame synchronization signal is formed by at least one symbol, and is set with an average amplitude lower than that of the payload signal to be distinguished from the payload signal. Regarding signal points, which are obtained by mapping the symbols of the short frame synchronization signal on the IQ plane, random data is temporarily set in the payload signal, cumulative addition of amplification values is performed over a plurality of frames, and the cumulative addition of amplification values is compared with a value obtained by cumulative addition of the amplification values of the short frame synchronization signal, and thus signal points with a cumulative addition value as an average amplitude lower than that of the payload signal can be set. Cumulative addition of the amplitudes of the symbols is equivalent to averaging, and thus the obtained value can be regarded as an average amplitude. Therefore, it is possible to set a short frame synchronization signal with an average amplitude lower than that of the payload signal.

On the reception side, short frame synchronization is established and then long frame synchronization is established. In short frame synchronization, a received signal is divided into a plurality of frames having the symbol length of the short frame, and the absolute values of the amplitudes of the symbols of the divided frames are cumulatively added over the plurality of frames for each symbol. Since the short frame synchronization signal is set with the average amplitude lower than that of the payload signal, it is possible to determine, as the short frame synchronization signal, the symbol specified by magnitude comparison in the width of the short frame based on the cumulative addition result.

For example, if the short frame is formed by one symbol, the symbol with the smallest cumulative addition result is the short frame synchronization signal. Since cumulative addition of the amplitudes of the symbols over the plurality of frames is equivalent to averaging, the results of cumulative addition of the amplitudes of the symbols are compared to each other, thereby making it possible to detect the short frame synchronization signal with an average amplitude lower than that of the payload signal.

The amplitudes to undergo cumulative addition are the absolute values of the I-coordinate value and Q-coordinate value on the IQ plane. These values are data before being determined as data of "0" or "1", and are values in a state in which information (likelihood information) representing the reliability is added. Next, in long frame synchronization, collation (cross-correlation synchronization) with a long frame synchronization pattern is performed for each short frame, thereby detecting the long frame synchronization signal to establish long frame synchronization. In short frame synchronization, the I and Q coordinates on the IQ plane set with the average amplitude lower than that of the payload signal are used. Since it is possible to observe the average amplitude by a simple method of cumulatively adding the I-coordinate values and the Q-coordinate values, it is possible to detect a synchronization pattern reliably and stably. Furthermore, by using the coordinate values on the IQ plane in the state in which the reliability is added before being determined as data of "0" or "1", it is possible to detect the short frame synchronization signal with high reliability even in a state in which an error rate deteriorates.

Furthermore, in long frame synchronization, a synchronization signal is detected for the unit of a plurality of short frames forming a long frame. Therefore, as compared with a case in which correlation is performed for all the symbols while shifting by one symbol, as in the conventional methods, it is possible to largely shorten the time until synchronization is established.

<Frame Synchronization System>

FIG. 1 is a view showing an example of the configuration of a frame synchronization system according an embodiment of the present invention. A transmission side of a frame synchronization system 1 includes a transmission signal processing circuit 10, a frame signal generation circuit 20, and an optical transmission circuit 30. A reception side of the frame synchronization system 1 includes an optical reception circuit 40, a received signal processing circuit 50, and a frame synchronization circuit 60. The optical reception circuit 40 on the reception side receives, via an optical transmission path such as an optical fiber 70, a frame signal generated on the transmission side.

The transmission signal processing circuit 10 divides transmission data into a horizontal polarization signal (XI, XQ) and a vertical polarization signal (YI, YQ), and performs error correction coding or other processing for each signal. The frame signal generation circuit 20 generates a frame signal based on the transmission data for each of the horizontal polarization signal (XI, XQ) and the vertical polarization signal (YI, YQ). Each frame signal is added with a frame synchronization signal for frame synchronization. The frame signals are converted into optical signals in the optical transmission circuit 30, and the horizontal polarization signal and the vertical polarization signal are combined and supplied to the optical fiber 70. As the transmission rate of the transmission data in this embodiment, for example, several hundred Gbps to 1 Tbps or higher is assumed.

The signal received via the optical fiber 70 is supplied to the optical reception circuit 40. The optical reception circuit 40 separates the optical signal into the horizontal polarization signal (XI, XQ) and the vertical polarization signal (YI, YQ), and the separated optical signals are converted into electrical signals, and supplied to the received signal processing circuit 50.

Each of the horizontal polarization signal (XI, XQ) and the vertical polarization signal (YI, YQ) is represented by an I component and a Q component on the IQ plane. XI and XQ represent the I component and Q component of the horizontal polarization signal, respectively, and YI and YQ represent the I component and Q component of the vertical polarization signal, respectively. That is, the I component and Q component correspond to an I-coordinate and Q-coordinate, respectively, when the received signal is represented by a complex number.

The received signal processing circuit 50 performs decoding processing and compensation processing for a distortion occurring in the received signal during transmission. The compensation processing can include, for example, wavelength dispersion compensation, polarization dispersion compensation, and frequency offset compensation. The decoding processing can include, for example, error correction processing.

The signal components XI, XQ, YI, and YQ are supplied to the frame synchronization circuit 60, and undergo frame synchronization establishment processing. The result of frame synchronization is used for various compensation processes and decoding processing in the received signal processing circuit 50.

Note that this embodiment has explained a case in which the optical signal is divided into a horizontal polarization signal and a vertical polarization signal and then transmitted. However, the present invention is not limited to this, and can be applied to a case in which only one of the horizontal polarization signal and the vertical polarization signal is transmitted.

<Operation of Frame Generation Circuit>

Figure 2:
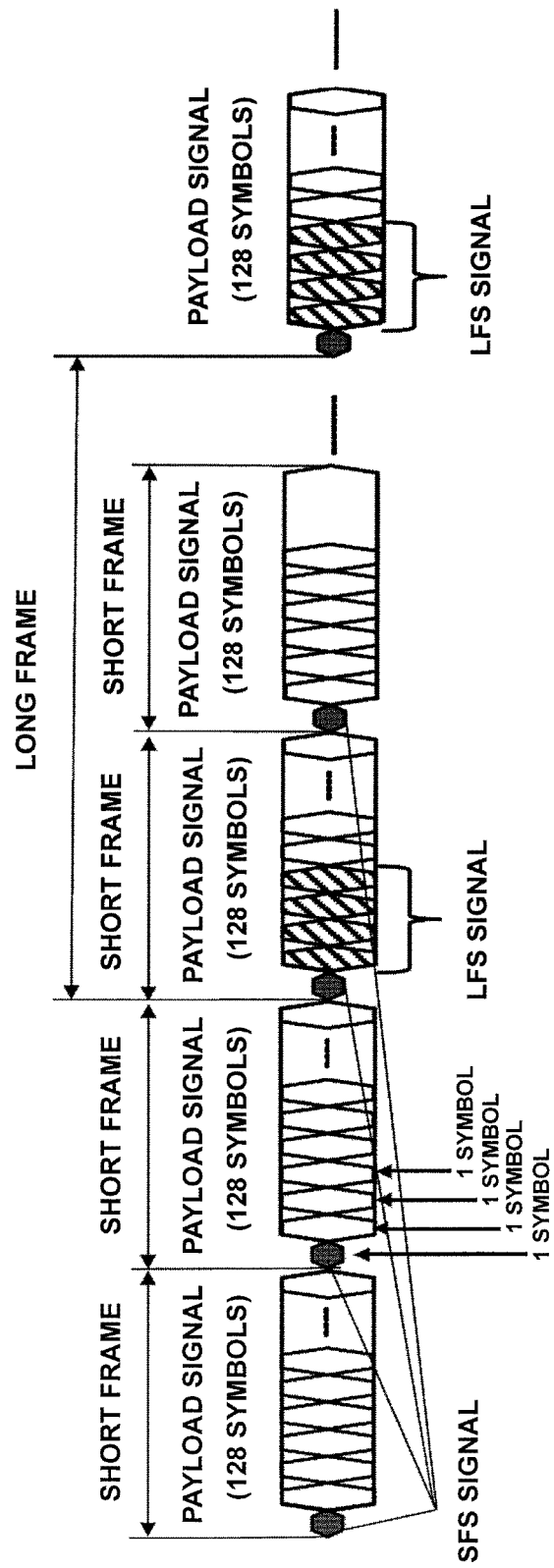
FIG. 2 is a view for explaining the operation of a frame signal generation circuit according to the embodiment of the present invention.

FIG. 2 is a view for explaining the operation of the frame signal generation circuit 20 according to the embodiment of the present invention. In the example shown in FIG. 2, a case in which a common frame synchronization signal is set for the horizontal polarization signal X and the vertical polarization signal Y will be described. However, frame synchronization signals can also be set in different forms.

A "symbol" described in this embodiment indicates the change timing of signal points (constellation) on the IQ plane in a modulation scheme in coherent optical communication. For example, in 64QAM, signal points are transitioned for every 6 bits, and the timing of the transition is a symbol. That is, the period of one symbol is 6 bits.

In the example shown in FIG. 2, a short-period short frame signal and a long-period long frame signal formed from a plurality of short frame signals are defined. The short frame signal is formed by a short frame synchronization signal (to be referred to as an SFS signal hereinafter) of one symbol and a payload signal of 128 symbols. The long frame signal is formed by a plurality of short frame signals, for example, several hundreds of short frame signals. For example, as shown in FIG. 2, a long frame synchronization signal (to be referred to as an LFS signal hereinafter) of the long frame signal can be formed by some data of the payload signal of the first short frame signal.

The SFS signal is set with the average amplitude lower than that of the payload signal. In this embodiment, among the signal points on the IQ plane, a signal point with a low amplitude is used as the SFS signal. For example, for a 64QAM signal, 16 signal points around the origin are used as SFS signals. For a 16QAM signal, four signal points around the origin are used as SFS signals. In this case, the same signal points may be used as the SFS signals for any short frame. Different signal points can be used for each short frame as long as it is possible to distinguish the average amplitude from that of the payload signal. Different signal points with the same amplitude can also be used. By shortening the frame length and facilitating distinction between the synchronization signal and the payload signal, short frame synchronization can be performed reliably even in the high-error rate situation.

The SFS signal is not limited to one symbol and can be formed by a plurality of symbols. From the viewpoint of efficiency of data transmission, one symbol is more preferable but when the SFS signal is formed by a plurality of symbols, it is possible to improve the reliability of synchronization. By appropriately selecting the number of symbols of the SFS signal, it is possible to form the SFS signal in consideration of both the reliability of synchronization and transmission efficiency. In synchronization detection on the reception side when the SFS signal is formed by a plurality of symbols, a plurality of successive symbols with relatively low values as a result of magnitude comparison of the results of cumulatively adding the amplitudes of the symbols over a plurality of frames are detected and specified, and those symbols are determined as the SFS signal.

The LFS signal can be formed by the predetermined symbols of one or a plurality of short frame signals. Similar to the SFS signal, if the number of symbols of the LFS signal is larger, the reliability of synchronization can be improved. However, the use of one entire short frame signal as the LFS signal is efficient in terms of synchronization processing.

The LFS signal can be formed by a plurality of SFS signals instead of the payload signal of the short frame. In the SFS signal, not a single signal point but a plurality of signal points on the IQ plane can be transitioned. Therefore, by transitioning the signal points using the plurality of SFS signals, the synchronization pattern of the LFS signal can be formed. When the LFS signal is formed by the plurality of SFS signals, it is unnecessary to set the payload signal of the short frame as the LFS signal, and it is thus possible to further improve the data transmission efficiency.

The SFS signal can be shared with a conventional phase compensation pilot signal (PS). This can also be used for lane identification and transmission path variation correction. As the LFS signal, a conventional long frame synchronization signal (TS) can be set. Conventionally, a phase compensation pilot signal (PS) or a long frame synchronization signal (TS) with a different modulation scheme is inserted into the payload. However, since reliable short frame synchronization can be established by the SFS signal, a PS or TS with a different modulation scheme need not be used.

<Signal Points of Short Frame Synchronization Signal>

Figure 3:
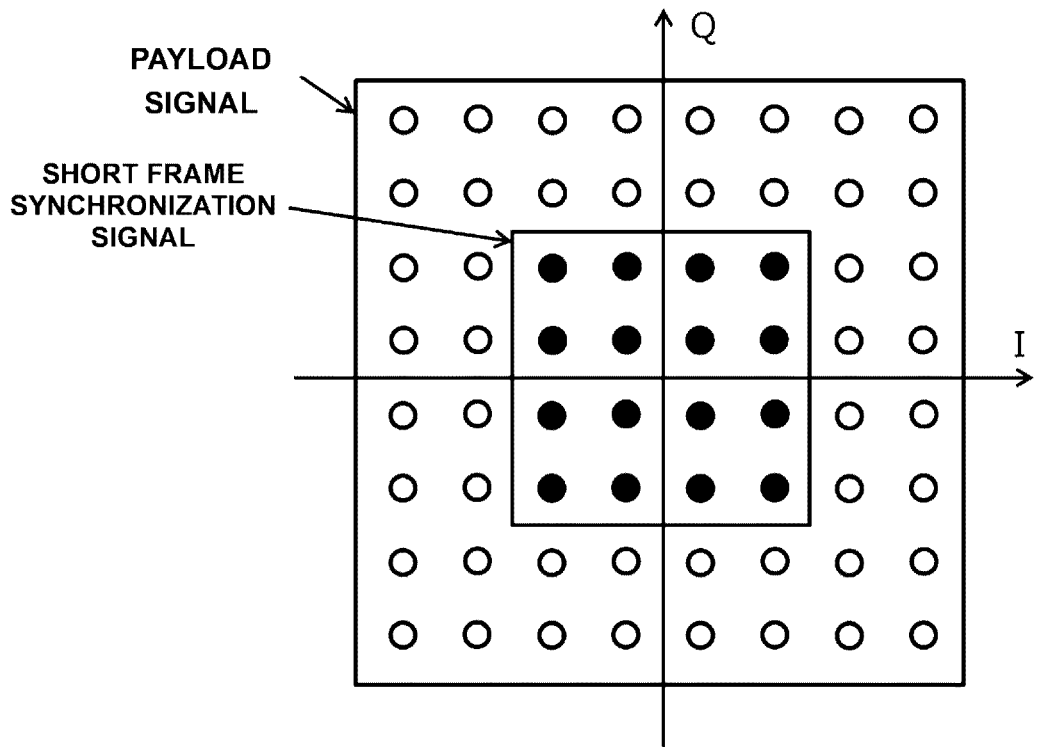
FIG. 3 is a view showing signal points of short frame synchronization signals and payload signals according to the embodiment of the present invention.

FIG. 3 is a view showing the signal points of the short frame synchronization signals and the payload signals according to the embodiment of the present invention. A case of 64QAM will be exemplified with reference to FIG. 3. In 64QAM, 64 signal points are held on the IQ plane. In the example shown in FIG. 3, only 16 signal points at the center are used as SFS signals. On the other hand, since all the 64 signal points are used as the payload signals, the average amplitude of the SFS signals can be made lower than that of the payload signals.

As described above, the LFS signal can be formed by a plurality of SFS signals. In the example shown in FIG. 3, the amplitude of the SFS signal can change in four levels in the I-axis direction and the Q-axis direction. By using this, the coordinate values on the IQ plane are transitioned to form a synchronization pattern. By using the synchronization pattern as the LFS signal, among the plurality of SFS signals forming the short frame, a predetermined SFS signal can be used as the LFS signal.

Note that the signal points with low amplitudes are not limited to the 16 points shown in FIG. 3. If it can be detected that the average amplitude is lower than the amplitude of the payload, any signal point may be used. In the X-polarization and Y-polarization, the signal points of the SFS signals and the LFS signal need not be the same. Furthermore, the signal points of the SFS signals need not be symmetrical on the IQ plane. Detection of a symbol with a low average amplitude suffices.

<Frame Synchronization Circuit>

Figure 4:
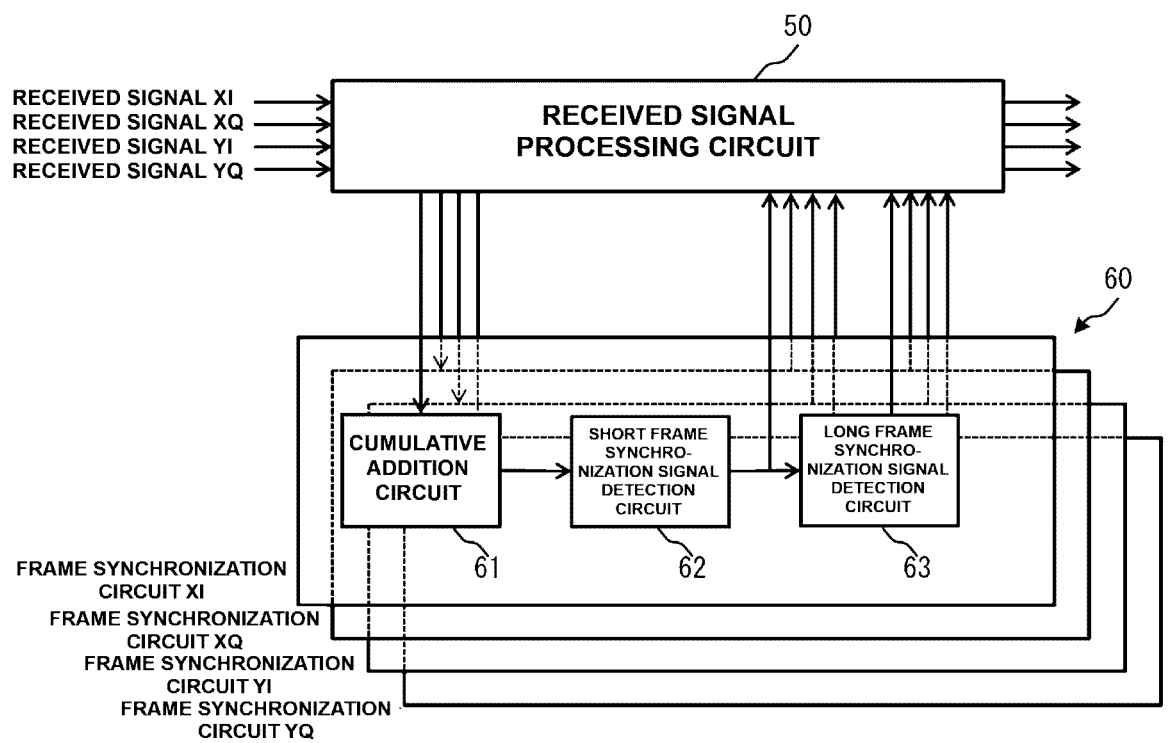
FIG. 4 is a view showing an example of the arrangement of a frame synchronization circuit according to the embodiment of the present invention.

FIG. 4 is a view showing an example of the arrangement of the frame synchronization circuit according to the embodiment of the present invention. In the example of the arrangement shown in FIG. 4, the optical reception circuit 40 supplies, to the received signal processing circuit 50, the received signals XI and XQ as the I component and Q component of the horizontal polarization signal X, respectively, and the received signals YI and YQ as the I component and Q component of the vertical polarization signal Y, respectively.

The received signals XI, XQ, YI, and YQ are supplied to frame synchronization circuits XI, XQ, YI and YQ, respectively, and the circuits individually perform short frame synchronization processing and long frame synchronization processing. Each of the frame synchronization circuits XI, XQ, YI and YQ includes a cumulative addition circuit 61, a short frame synchronization signal detection circuit 62, and a long frame synchronization signal detection circuit 63.

The cumulative addition circuit 61 divides each of the supplied received signals XI, XQ, YI, and YQ in the length (in the example shown in FIG. 1, every 129 symbols) of the short frame, and cumulatively adds, over the plurality of frames, the absolute values of the coordinate values on the IQ plane in the symbols at the identical symbol positions of the plurality of divided frames. At this time, the cumulative addition circuit 61 adds the absolute values of the values (I-coordinate, Q coordinate) on the IQ plane, which are values before being determined as "0" or "1".

The short frame synchronization signal detection circuit 62 detects the SFS signal based on the cumulative addition result of the cumulative addition circuit 61. The absolute values of the amplitudes of the respective symbols of the width of the short frame are cumulatively added over the plurality of frames, and the symbol specified by magnitude comparison in the frame based on the cumulative addition result is determined as the SFS signal. If, for example, the SFS signal is formed by one symbol, a symbol with a smallest cumulative addition result is detected as the SFS signal.

The long frame synchronization signal detection circuit 63 detects the LFS signal from each of the received signals XI, XQ, YI, and YQ using the SFS signal detection result of the short frame synchronization signal detection circuit 62. In long frame synchronization, the received signal and a reference long frame synchronization signal are correlated for each short frame divided by the SFS signal, thereby detecting the LFS signal. As the received signal after short frame synchronization which is correlated with the reference long frame synchronization signal, the coordinate values on the IQ plane can be used intact but data (to be described later) after being determined as "0" or "1" can also be used.

The received signals XI, XQ, YI, and YQ are also supplied as values on the IQ plane to the long frame synchronization signal detection circuit 63. Data obtained after determining the signals as "0" or "1" can also be supplied. By using the data obtained after determining the signals as "0" or "1", correlation can be performed by comparison with the reference long frame synchronization signal. Since the LFS signal is detected after short frame synchronization is established, the LFS signal may be detected more efficiently by comparing, with the reference signal, the data obtained after being determined as "0" or "1", as compared with the processing using the coordinate values on the IQ plane. For example, if the LFS signal is long, the calculation processing when performing comparison can become more efficient by comparison of the data of "0" or "1".

Note that the above-described short frame synchronization processing and long frame synchronization processing can be executed independently for each of the received signals XI, XQ, YI, and YQ. However, by collectively processing the signals XI and XQ as a complex and the signals YI and YQ as a complex, it is possible to perform synchronization processing for two signals of the horizontal polarization signal X and the vertical polarization signal Y.

<Frame Synchronization Method>

A frame synchronization method according to the embodiment of the present invention will be described with reference to FIGS. 5 to 9. The frame synchronization method according to the embodiment of the present invention includes a frame signal generation step of generating a frame signal including a plurality of short frame signals each including an SFS signal and a payload signal, and a frame synchronization step of detecting the SFS signal from the received frame signal, and establishes short frame synchronization by detecting the SFS signal. In the frame signal generation step, an LFS signal is set in a predetermined symbol of the short frame signal. In the frame synchronization step, long frame synchronization is established by detecting the LFS signal.

FIG. 5 is a flowchart illustrating the frame synchronization method according to the embodiment of the present invention. The above-described frame synchronization step of the frame synchronization method will be explained with reference to FIG. 5.

In cumulative addition processing (step S1), the cumulative addition circuit 61 divides each of the supplied received signals XI, XQ, YI, and YQ in the length (in the example shown in FIG. 1, every 129 symbols) of the short frame, and cumulatively adds, over the plurality of frame signals, the absolute values of the values, on the IQ plane, of the signals at the identical symbol positions of the plurality of divided frames.

In short frame synchronization processing (step S2), the short frame synchronization signal detection circuit 62 detects the SFS signal based on the result of the cumulative addition processing in step S1. The absolute values of the amplitudes of the respective symbols of the width of the short frame are cumulatively added over the plurality of frames, and the symbol specified by magnitude comparison in the frame based on the addition result is determined as the SFS signal. If, for example, the SFS signal is formed by one symbol, a symbol with a smallest cumulative addition result is detected as the SFS signal.

In long frame synchronization processing (step S3), the long frame synchronization signal detection circuit 63 detects the LFS signal from each of the received signals XI, XQ, YI, and YQ using the result of the short frame synchronization processing by the SFS signal detection in the short frame synchronization processing in step S2.

As described above, in the frame synchronization method of this embodiment, a short frame synchronization signal is detected to establish short frame synchronization, and a long frame synchronization signal is detected to perform long frame synchronization processing for the received signal for which short frame synchronization has been established.

<Short Frame Synchronization>

FIG. 6 is a view for explaining a method of detecting the short frame synchronization signal according to the embodiment of the present invention. As described in step S1 of FIG. 5, to detect the short frame synchronization signal, each of the received signals XI, XQ, YI, and YQ supplied to the cumulative addition circuit 61 is divided in the length of the short frame, and the absolute values of the values of the signals at the identical symbol positions of the plurality of divided frames are added over the plurality of frames.

In the example shown in FIG. 6, the width of the short frame is formed by 129 symbols, and thus each of the received signals XI, XQ, YI, and YQ is divided for every 129 symbols, as shown at the uppermost stage in FIG. 6. The absolute values of the amplitudes of the symbols are cumulatively added for each of the 129 symbols from the first symbol (symbol A) to the 129th symbol over the plurality of frames, and then the addition results of the respective symbols are represented as amplitude addition value 1, amplitude addition value 2, . . . , amplitude addition value 129. Since the SFS signal is formed by one symbol, the symbol having the smallest value among amplitude addition value 1, amplitude addition value 2, . . . , amplitude addition value 129 is determined as the SFS signal.

The number of frames to be added can be, for example, about 30, but is not limited to this. The number of frames to be added can be determined appropriately in accordance with the status of the transmission path and the like.

In short frame synchronization detection of this embodiment, the values to be added are the absolute values of the coordinate values on the IQ plane of each of the received signals XI, XQ, YI, and YQ. These values are values indicating the coordinates on the IQ plane, and are values before being determined as "0" or "1". The IQ plane is also called a complex plane.

In general, when determining the coordinate values on the IQ plane as "0" or "1", a complicated error correction circuit is required. However, in short frame synchronization detection according to this embodiment, since values indicating the coordinates on the IQ plane are used, such complicated error correction circuit is unnecessary. In addition, in the value determined as "0" or "1", information (to also be called likelihood information) indicating the reliability of the value, for example, "0" close to "1" or "1" close to "0"

is lost. By using the coordinate values on the IQ plane in which the likelihood information remains, it is possible to obtain high-reliability synchronization signal detection result even in the state in which the error rate is high.

Figure 7:
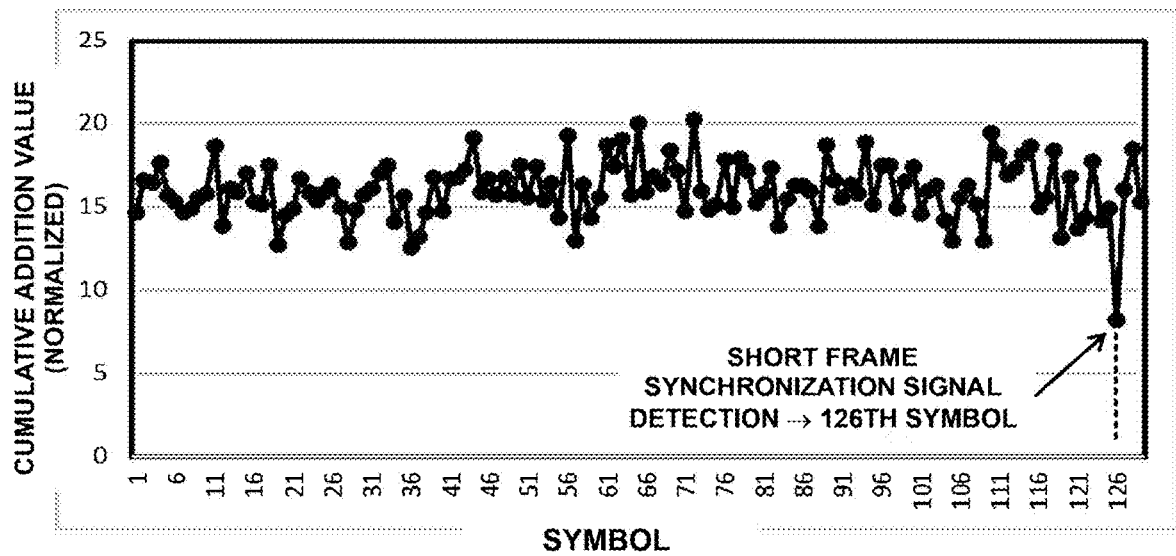
FIG. 7 is a graph showing an output of a cumulative addition circuit according to the embodiment of the present invention.

FIG. 7 is a graph showing an output of the cumulative addition circuit according to the embodiment of the present invention. The abscissa represents the order of the symbols at the time of division. The ordinate represents a cumulative addition value, and amplitude addition values 1 to 129 described with reference to FIG. 6 are plotted. Referring to FIG. 7, the number of frames to be cumulatively added is 32. Note that the cumulative addition value on the ordinate is a normalized value.

In FIG. 7, since the SFS signal is formed by one symbol, the symbol having the smallest value among amplitude addition values 1 to 129 is detected. As shown in FIG. 7, since the amplitude addition value of the 126th symbol is the smallest value, the 126th symbol in the divided frame can be estimated as the SFS signal.

The case in which the SFS signal is formed by one symbol has been explained in the examples shown in FIGS. 6 and 7. If the SFS signal is formed by a plurality of symbols, a plurality of successive symbols having relatively small values as a result of magnitude comparison of the results of cumulatively adding the amplitudes of the symbols over the plurality of frames are detected and specified, and those symbols are determined as the SFS signal. If, for example, there are a plurality of symbols having the smallest cumulative addition values, the symbols may be determined as the SFS signal. Alternatively, a plurality of symbols included in a predetermined value range around the smallest value may be determined as the SFS signal. The determination condition of the SFS signal can be determined appropriately in accordance with the status of the transmission path and the like.

Furthermore, the above-described cumulative addition processing and smallest value detection processing for 32 frames are regarded as one SFS signal estimation processing, and this processing is repeated a plurality of times. If, as a result, the same result is obtained successively N times (for example, twice), it is officially determined that synchronization has been established, and the symbol is set as the final symbol of the SFS signal, and determined as the boundary of the short frame.

On the other hand, if the above SFS signal estimation processing is repeated all the time thereafter, and different results are obtained successively M times (for example, five times), a synchronization loss is determined. If, for example, different symbols are estimated successively like the 123rd symbol, 96th symbol, 56th symbol, 3rd symbol, and 45th symbol, a synchronization loss is determined. After detecting a synchronization loss, for example, synchronization establishment processing is executed again in response to an instruction from the received signal processing circuit.

Note that in the processing of detecting the smallest value of the cumulative addition values, in 64QAM, the cumulative addition value cannot take the maximum value or a larger value of the coordinates of the 64 signal points. If the cumulative addition value takes a value equal to or larger than the maximum value, it is possible to perform a contrivance to improve the reliability of detection as much as possible, for example, by setting the maximum value or setting a threshold as a detection condition, even in the state in which the error rate is high.

Figure 8:
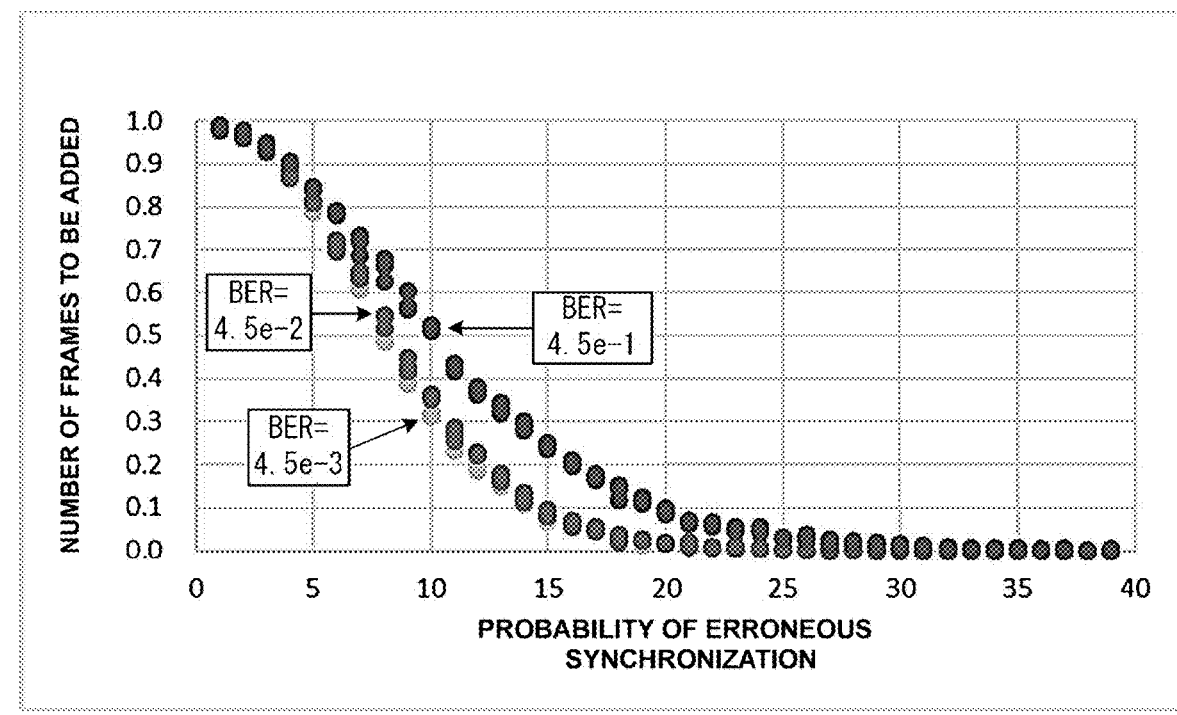
FIG. 8 is a graph showing a result of measuring the probability of erroneous synchronization in short frame synchronization detection according to the embodiment of the present invention.

FIG. 8 shows a result of measuring the probability of erroneous synchronization in short frame synchronization detection according to the embodiment of the present invention. The abscissa represents the number of frames to be cumulatively added, and the ordinate represents the probability of erroneous synchronization. The probability of erroneous synchronization is a ratio of the number of times the result of finally determining that synchronization is established (for example, the same result is obtained successively N times) is an error with respect to the number of times of execution of short frame synchronization processing in the state of a given error rate. For example, if the detection processing is performed 100 times, and then the number of times synchronization cannot be detected is 10, the number of times synchronization can be detected correctly is 10, and the number of times synchronization is erroneously detected is 80, the probability of erroneous synchronization is 0.8. In general, under the same detection condition, as the error rate is higher, the probability of erroneous synchronization increases.

Measurement is performed for three error rates of BER=4.5e-1, 4.5e-2, and 4.5e-3. The error rate=4.5e-1 indicates a deteriorated state in which 45 symbols are erroneous on average among 100 symbols.

As shown in FIG. 8, when short frame synchronization detection is used, if the number of frames to be cumulatively added is 32 or larger, it is possible to suppress the probability of erroneous synchronization to 0.01 or less even in the deteriorated state in which the error rate=4.5e-1. In short frame synchronization according to this embodiment, it is possible to stably detect synchronization even in the state in which the error rate deteriorates. This can decrease the number of times synchronization processing is retried, thereby reducing the time until synchronization is established. For example, it is possible to reduce the synchronization time to about 1/100 the convention synchronization time.

<Long Frame Synchronization>

Figure 9:
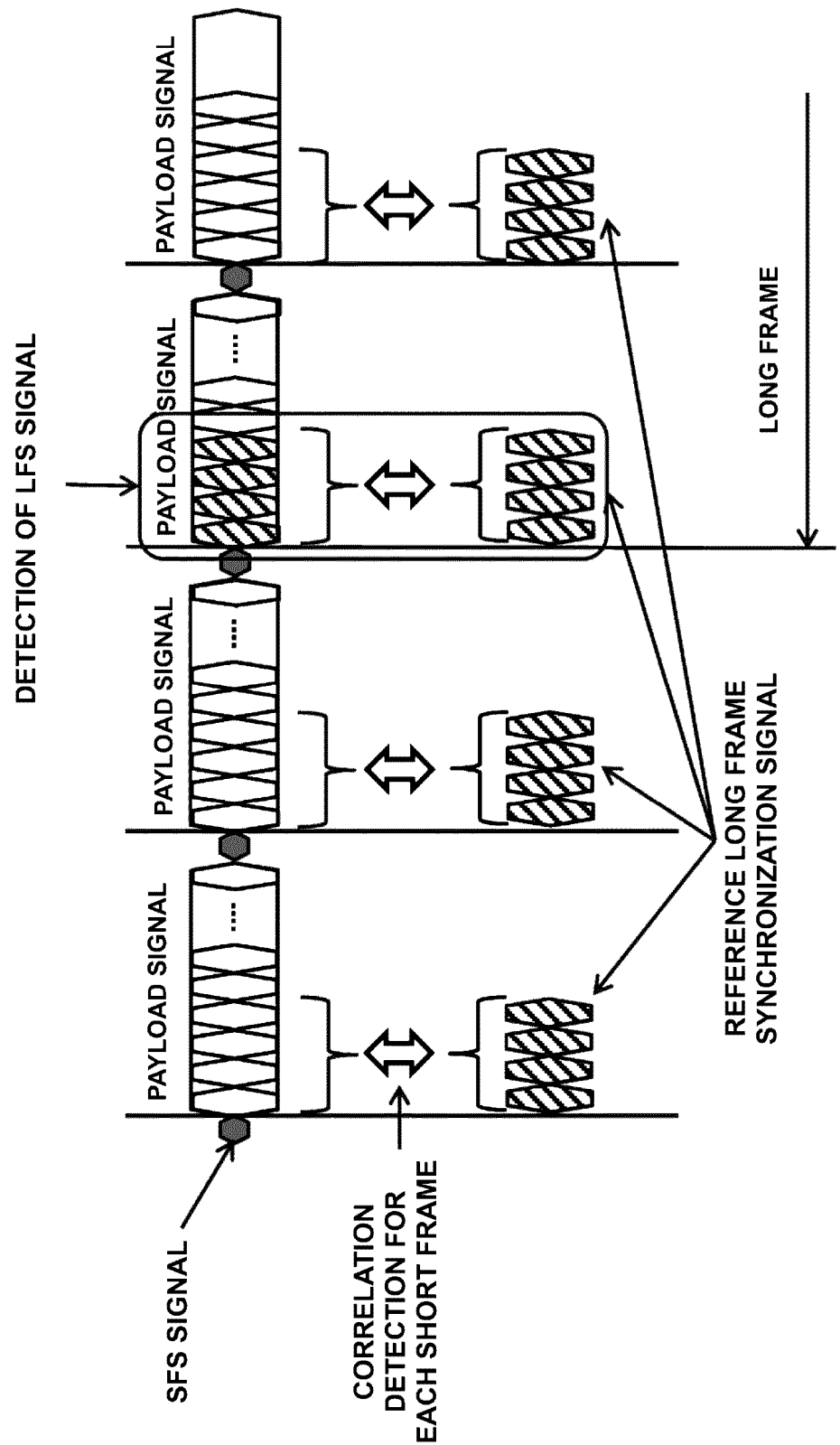
FIG. 9 is a view for explaining a method of detecting a long frame synchronization signal according to the present invention.

A method of detecting the LFS signal will be described with reference to FIG. 9. In this embodiment, long frame synchronization is established based on the short frame for which synchronization is established by detection of the SFS signal. Referring to FIG. 9, after short frame synchronization is established, the LFS signal inserted into the payload of the short frame is detected, thereby establishing long frame synchronization. In the example shown in FIG. 9, the LFS signal is set in the payload of the first short frame of the long frame formed from the plurality of short frames.

In long frame synchronization, as a synchronization method, the payload signal in which the LFS signal is set and the reference long frame synchronization signal are correlated for each short frame divided by the SFS signal, thereby detecting the LFS signal. As the received signal after short frame synchronization which is correlated with the reference long frame synchronization signal, the coordinate values on the IQ plane can be used and compared with the reference long frame synchronization signal.

The coordinate values on the IQ plane can be used to determine the received signal as data of "0" or "1", and the data of "0" or "1" can be compared with the reference long frame synchronization signal. In the long frame synchronization processing, after short frame synchronization is established, comparison with the reference signal is performed for each short frame. Therefore, correlation detection may be performed more efficiently by the method of comparing the data of "0" or "1" with the reference signal. For example, if the LFS signal is long, the calculation processing when performing comparison can become more efficient by comparing the data of "0" or "1" with the reference signal.

Unlike the conventional frame synchronization, in long frame synchronization according to this embodiment, since it is unnecessary to perform correlation for all the symbols while shifting by one symbol, and collation is performed for each short frame, it is possible to largely reduce the time until frame synchronization is established. If, for example, the short frame is formed by 129 symbols, the number of times of execution of synchronization processing for the long frame can actually be reduced to 1/129 the conventional number of times.

Note that the case in which the LFS signal inserted into the payload of the short frame is detected to establish long frame synchronization has been explained with reference to FIG. 9. However, as described above, the LFS signal can be formed by a plurality of SFS signals. By forming a synchronization pattern by transitioning the coordinate values on the IQ plane under the condition satisfied by the SFS signal and using the synchronization pattern as the LFS signal, the plurality of SFS signals forming the short frame can be used as the LFS signal.

As described above, the frame synchronization system of this embodiment is configured to perform the synchronization detection processing on the IQ plane with reliability using simple synchronization signals in short frame synchronization. Therefore, even in the status in which the error rate is high, detection of erroneous synchronization can be reduced, and short frame synchronization can be performed reliably and stably.

Furthermore, since frame synchronization is performed in two stages of short frame synchronization and long frame synchronization, that is, long frame synchronization is performed for each short frame after establishing short frame synchronization, long frame synchronization can be established within a very short time, as compared with the conventional method of directly performing long frame synchronization.

Since the short frame synchronization signal of this embodiment is set with the average amplitude lower than that of the payload signal, a symbol of a low amplitude is periodically inserted to decrease the average amplitude value, thereby obtaining the power saving effect. The similar effect is obtained by coding called probabilistic shaping that can make the occurrence probability of the amplitude values of the signal points on the IQ plane close to a normal distribution to improve noise resistance.

INDUSTRIAL APPLICABILITY

The present invention can be used as a frame synchronization apparatus for determining the state of frame synchronization in an optical communication apparatus for coherent optical communication.

EXPLANATION OF THE REFERENCE NUMERALS AND SIGNS

1 . . . frame synchronization system, 10 . . . transmission signal processing circuit, 20 . . . frame signal generation circuit, 30 . . . optical transmission circuit, 40 . . . optical reception circuit, 50 . . . received signal processing circuit, 60 . . . frame synchronization circuit, 70 . . . optical fiber

The invention claimed is:

1. A frame synchronization system comprising:
a frame signal generation circuit configured to generate a frame signal including a plurality of first frame signals each including a first frame synchronization signal and a first payload signal, wherein the first frame synchronization signal includes at least one symbol, is set with an average amplitude lower than an average amplitude of the first payload signal, and forms an arbitral pattern on an IQ plane; and
a frame synchronization circuit configured to receive, via an optical transmission path, the frame signal generated by the frame signal generation circuit as coordinate values on the IQ plane, and detect the first frame synchronization signal from a received signal, the frame synchronization circuit dividing the received signal into frames each having a symbol length of the first frame signal, adding absolute values of the I-coordinate values and Q-coordinate values on the IQ plane of a signal at an identical symbol position of each of the plurality of divided frames over the plurality of frames, and determining a symbol specified by magnitude comparison based on a result of the addition in the frame as the first frame synchronization signal.

2. The frame synchronization system according to claim 1, wherein the first frame synchronization signal is formed by one symbol, and the symbol with the smallest addition result specified by magnitude comparison in the frame is determined as the first frame synchronization signal.

3. The frame synchronization system according to claim 1, wherein the frame signal generation circuit is configured to set a second frame synchronization signal representing the position of a second frame signal having a period longer than that of the first frame signal to a predetermined symbol of the first frame signals in the second frame signal, and
the frame synchronization circuit
performs determination using addition of the coordinate values of the first frame synchronization signal during at least one period of the second frame signal, and detects the second frame synchronization signal by correlating with a reference frame synchronized frame at the predetermined symbol for each of the first frame signals obtained by the determination.

4. The frame synchronization system according to claim 3, wherein the second frame synchronization signal is set to at least some of symbols of the first payload signal.

5. The frame synchronization system according to claim 3, wherein the second frame synchronization signal is set to the symbols of the plurality of first frame synchronization signals.

6. The frame synchronization system according to claim 5, wherein a synchronization pattern of the second frame synchronization signal is formed by transitioning coordinate values on the IQ plane from the first frame synchronization signal.

7. A frame synchronization circuit of a frame synchronization system defined in claim 1.

8. A frame synchronization method in a frame synchronization system including a frame signal generation circuit and a frame synchronization circuit, comprising:
a frame signal generation step of generating a frame signal including a plurality of first frame signals each including a first frame synchronization signal and a first payload signal, wherein the first frame synchronization signal includes at least one symbol, is set with an average amplitude lower than an average amplitude of the first payload signal, and forms an arbitral pattern on an IQ plane; and
a frame synchronization step of receiving, via an optical transmission path, the frame signal generated by the frame signal generation circuit as coordinate values on the IQ plane, and detecting the first frame synchronization signal from a received signal, the frame synchronization step including steps of dividing the received signal into frames each having a symbol length of the first frame signal, adding absolute values of the I-coordinate values and Q-coordinate values on the IQ plane of a signal at an identical symbol position of each of the plurality of divided frames over the plurality of frames, and determining a symbol specified by magnitude comparison based on a result of the addition in the frame as the first frame synchronization signal.

\* \* \* \* \*